(12) United States Patent
Gramatte

(10) Patent No.: US 8,398,000 B2
(45) Date of Patent: Mar. 19, 2013

(54) CONNECTION ELEMENT FOR RUNNING RAILS AND RUNNING-RAIL SYSTEM

(75) Inventor: Georg Gramatte, Eimeldingen (DE)

(73) Assignee: Conductix-Wampfler GmbH, Weil am Rhein-Markt (DE)

( * ) Notice: Subject to any disclaimer, the term of this patent is extended or adjusted under 35 U.S.C. 154(b) by 227 days.

(21) Appl. No.: 12/808,700

(22) PCT Filed: Dec. 4, 2008

(86) PCT No.: PCT/EP2008/066792
§ 371 (c)(1),
(2), (4) Date: Sep. 14, 2010

(87) PCT Pub. No.: WO2009/080460
PCT Pub. Date: Jul. 2, 2009

(65) Prior Publication Data
US 2011/0000393 A1    Jan. 6, 2011

(30) Foreign Application Priority Data
Dec. 22, 2007    (DE) .................. 10 2007 062 466

(51) Int. Cl.
*E01B 11/00*    (2006.01)
*E01B 9/00*    (2006.01)
*E01B 25/22*    (2006.01)
(52) U.S. Cl. .................... 238/243; 238/312; 104/106
(58) Field of Classification Search ............ 104/106, 104/110, 118; 238/151, 243–245, 250, 251, 238/310, 312
See application file for complete search history.

(56) References Cited

U.S. PATENT DOCUMENTS

| 4,140,417 A | 2/1979 | Danielsen et al. |
| 4,641,989 A * | 2/1987 | Maddi ........................ 403/302 |
| 7,534,066 B2 | 5/2009 | Lolk et al. |

(Continued)

FOREIGN PATENT DOCUMENTS

| DE | 2741096 A1 | 3/1979 |
| DE | 3343075 A1 | 6/1985 |

(Continued)

OTHER PUBLICATIONS

International Preliminary Report published Aug. 10, 2010 for PCT/EP2008/066792, filed Dec. 4, 2008 (English translation). Written Opinion published Aug. 4, 2010 for PCT/EP2008/066792, filed Dec. 4, 2008 (English translation).

(Continued)

*Primary Examiner* — Robert McCarry, Jr.
(74) *Attorney, Agent, or Firm* — Martin Fleit; Paul D. Bianco; Fleit Gibbons Gutman Bongini & Bianco PL

(57) ABSTRACT

The invention relates to a connection element for running rails of a suspended track for receiving the running rails (2, 2') and a securing device for securing the running rails (2, 2') against being pulled out of the cavity (H, H') and a running rail system having multiple running rails (2, 2'), which can be connected by connection elements (1; 11). The invention solves the problem of allowing simple and rapid tool-free mounting with a simultaneous secure connection of running rails of the running rail system in that the securing device of the connection element has at least one spring-elastic first connection claw (8; 12; 15), which projects diagonally in an insertion direction (E) of a first running rail (2) into the cavity (H) in the relaxed state, and/or by a running rail system having connection elements (1; 11) implemented in this way.

20 Claims, 7 Drawing Sheets

U.S. PATENT DOCUMENTS

2008/0056815 A1 3/2008 Lolk et al.
2008/0310911 A1 12/2008 Jones et al.

FOREIGN PATENT DOCUMENTS

| | | |
|---|---|---|
| DE | 4317498 A1 | 12/1994 |
| GB | 956036 A2 | 4/1964 |
| GB | 979213 A | 1/1965 |
| WO | 2005089691 A1 | 9/2005 |
| WO | 2007068897 A1 | 6/2007 |

OTHER PUBLICATIONS

International Search Report published Oct. 8, 2009 for PCT/EP08/066792 filed Dec. 4, 2008.

Written opinion received Mar. 2010 for PCT/EP08/066792 filed Dec. 4, 2008.

International Preliminary Report on Patentability published Jun. 22, 2010 for PCT/EP2008/066792, filed Dec. 4, 2008.

* cited by examiner

CONNECTION ELEMENT FOR RUNNING RAILS AND RUNNING-RAIL SYSTEM

FIELD OF THE INVENTION

The invention relates to a connection element for running rails of a suspended track and also to a running-rail system.

BACKGROUND OF THE INVENTION

Such a connection element emerges from DE 43 17 498 A1. The suspended track running rails there are made essentially from a U-profile whose leg ends are angled against each other while leaving a central passage forming the running surfaces. In order to connect two running rails to each other at their ends, a connector is used that has essentially the same cross section as the running rails, but surrounds these running rails. A fixed connection that is secured against undesired extraction or spreading of the connected running rails is achieved in that the ends of the running rails have boreholes that are aligned with boreholes in the connector. Then machine screws are screwed through the aligned boreholes and these screws prevent slippage or extraction of the running rails. Indeed, this type of connection represents a secure connection, but the assembly is complicated. Thus, the boreholes in the running rails must be aligned with the boreholes in the connector and then the machine screws are screwed in with a tool. Indeed, the screws can be pre-screwed for the production of the connector, but during transport of the connector there is then the risk that, due to impacts on the projecting screws, these screws will fall out or the threading of the screws or of the boreholes will be damaged. Also, a tool must always be carried along for tightening the screws.

There is likewise the possibility that the connector has machine screws that are screwed blind onto the C-rail and are fixed by lock nuts. That is, in this case the rail does not have boreholes in which the screws of the connector engage. The C-rails are here only clamped. A disadvantage here is that, if the screws are tightened too much, the legs of the C-rails bend too far inward and thus the running room for the car guided therein becomes too small and the car can become jammed therein. With insufficient tightening of the screws, the connection can become loose during operation. Also, tools are required here to create the connection.

To allow a tool-free connection of the running rails, WO 2007/068897 A1 provides an alternative connector and an alternative running-rail system. There, the ends of the running rails in the longitudinal direction have an elevated section that is broken by a recess shortly before its end. The running rails are then pushed into a connector that has a corresponding cross section. In the connector, slots are provided that then correspond to the recesses and through which two connection brackets of a plug element could be passed, in order to create the connection. This plug element has a spring bracket that is adapted essentially to the shape of the connector and that comes to lie on the outside of the connector. When the plug element is inserted completely into the connector and through the recesses into the running rails, the spring bracket of the plug element snaps into the outer contours of the connector, in order to secure it against falling out. This does indeed allow a tool-free assembly of a running-rail system, but has the disadvantage that, in addition to the connector, another plug element is necessary that must be adapted as precisely as possible to the shape of the connector. In addition, the recesses in the running rails must be moved precisely into agreement with the slots of the connector during the assembly of the running-rail system, so that the brackets of the plug element can be inserted both through the slots of the connector and also through the recesses in the running rails.

WO 2005/089691 relates to a closure coupling for two rails of a suspended rail track. For this purpose, at the ends of two rails, there are first or second coupling parts that are provided for coupling with each other when the two rails are aligned with each other. Each of the coupling parts has a hinged closure part, and the first coupling part has a closure bolt part with a beveled end that can be moved into engagement with a pin projecting from the closure part of the second coupling part, wherein the closure bolt part is designed to engage in a recess of the closure part, wherein both closure parts are activated by shifting of the closure bolt part. This is disadvantageous in that the secure, fixed, and detachable connection of two rails is allowed only with a complicated, expensive, and laborious closure coupling.

DE 27 41 096 A1 relates to a rail system, in particular, for two-track suspended rail vehicles for transporting passengers, essentially comprising box-shaped track carriers arranged with expansion joints in their longitudinal extent with tracks for load-bearing wheels or guide rollers of running gear operating within this carrier, wherein the track carriers are provided with a slot for the passage of suspension devices connecting the running gear to the cabin. In order to bridge the expansion joints arranged between the track carriers in the simplest and most spatially compact way possible, wherein the bridging should automatically and continuously compensate for changes in length of the carriers, the expansion joint between two track carriers is bridged in the region of the tracks for the load-bearing wheels or guide rollers by a triangular filler piece that is inserted into each of these tracks and that lies with its inclined surfaces against corresponding inclined surfaces formed on the track carriers under the force of a spring.

DE 33 43 075 C2 relates to a suspended rail track, in particular a suspended monorail track, comprising a profiled running rail that can be suspended with suspension attachment means and cars in which the profiled running rail is made from an elongated hollow body and a continuous longitudinal slot for holding the suspension attachment means. The suspension attachment means are made from a metal bracket with an insertion point with subsequently adjacent barbs that project laterally from the bracket plane and that are both arranged within a T-shaped, elongated hollow body used as a profiled running rail, wherein the barbs engage behind webs that are arranged on the side of a continuous longitudinal slot in the terminal side of the T-shaft of the profiled running rail. The assembly of the profiled running rail on the suspension attachment means already mounted on the cover side is realized only by insertion of the insertion point of the suspension attachment means into the longitudinal slot of the profiled running rail and further upward pressing of the profiled running rail in which the two side surfaces of the T-shaft are inclined outward, slide past the outer surfaces of the barbs, and can be subsequently snapped together again, so that the webs engage behind the barbs. Here, it is not possible to simply remove the insertion point again from the longitudinal slot of the profiled running rail.

SUMMARY OF THE INVENTION

Therefore, the task of the invention is to disclose a connection element or running-rail system named above that eliminates the disadvantages named above and allows, in particular, a simple and quick, tool-free assembly that is at the same time a secure connection of the running rails of the running-rail system.

The invention achieves this task by a connection element according to the disclosure and also by a running-rail system according to the disclosure. Advantageous refinements and embodiments of the invention are further described in accordance with the disclosure.

The invention provides that the securing device of the connection element named above has at least one spring-elastic, first connection claw projecting into the cavity in the relaxed state at an angle in an insertion direction of a first running rail. In this way, advantageously a secure connection of the running rail to the connection element is produced, without requiring additional loose components or tools, because the connection can be produced exclusively by the connection element itself. This simultaneously allows a quick and simple assembly of the running-rail system.

In a preferred embodiment, the secure connection is guaranteed in that the at least one connection claw is constructed in order to be pressed from the cavity from its relaxed state by the running rail when this running rail is inserted, and digs into this rail in a flexible way when the first running rail is pulled out. The digging-in process is realized during the pulling-out process in that the connection claw is placed flexibly on the pushed-in running rail and the rail is pulled against the inclined position of the claw during the pulling-out process. The stronger it is pulled, the stronger the connection claw is applied against the running rail and the greater the claw digs into this rail. However, above a certain pulling force, the running rail can be pulled out from the connection element. This pulling force is dimensioned such that, for normal use, it is not possible to pull out the running rail.

Advantageously, an embodiment of the invention provides that the connection claw has a spring-elastic tab projecting inward at an angle into the cavity in the insertion direction. The spring-elastic tab guarantees that, during the insertion of the running rail, the connection claw can be pressed out from the cavity and, on the other hand, is placed under a biasing stress on the inserted running rail.

In order to guarantee a secure connection between the connection element and running rail, a front end of the connection claw projecting into the cavity can be constructed as means for digging into the running rail, wherein, in the production-specific, advantageous embodiments, it can be constructed as a cutting edge or point. In order to guarantee improved digging of the means for digging into the running rail during the pulling-out process of the running rail, the means for digging can be angled in the direction of the running rail to be pushed into the cavity.

In order to connect two running rails simply and quickly, in one advantageous embodiment of the invention, a second spring-elastic connection claw corresponding to the first connection claw can be provided that projects into the cavity at an angle in the insertion direction of the second running rail in the relaxed state. In particular, this is advantageous for a connection element in which the running rails are pushed from insertion directions that are diametrically opposite each other.

In order to simplify the insertion and thus the assembly of the running-rail system, a spring-elastic first insertion-limiting bracket can be provided advantageously on the connection element, wherein this bracket is arranged for limiting the insertion of the first running rail in its insertion direction into the cavity provided for it on the connection element and projects into the other cavity provided for the second running rail. Preferably, the insertion-limiting bracket can have a stop edge that runs in a plane running perpendicular to the insertion direction of the first running rail.

The first insertion-limiting bracket can advantageously project in the relaxed state at an angle into the cavity provided for the second running rail, in order to be pressed from the cavity by the second running rail when this second running rail is inserted. In particular, for an embodiment with diametrically opposed insertion directions, it is further advantageous when a spring-elastic, second insertion-limiting bracket is provide for limiting the insertion of the second running rail in its insertion direction into the cavity on the connection element, wherein this bracket projects in the relaxed state at an angle into the cavity provided for the first running rail and is constructed in order to be pressed out from the cavity by the first running rail when the first running rail is inserted into the cavity. Preferably, the insertion-limiting brackets project at an angle against the insertion direction of the running rail for which they form the stop in the region of the cavity for the other running rail. In particular, for a connection element for two running rails with diametrically opposed insertion directions, during the insertion into the region of the cavity provided for it, the running rail inserted first then presses the insertion-limiting bracket arranged therein out from this region of the cavity, while the other insertion-limiting bracket arranged in the region of the cavity provided for the other, not yet inserted running rail is used as a stop for the first inserted running rail. Optionally, because the first inserted running rail is held by a connection claw securely in the connection element, this running rail is used on its side as a stop for the other running rail inserted at a later time. In this way, the running rails can be connected end to end, without a break remaining between them. In this way, good smooth running for the vehicles guided in the running rails is produced.

In an advantageous embodiment, the connection claws and/or the insertion-limiting brackets can be formed integrally from the connection element, in particular, stamped or cut. In this way, a quick and simple production as well as a simple assembly can be achieved. If the connection claws and/or the means for digging are hardened, then, for the case of an integral connection element, the same or only slightly harder material could be used for the connection element as for the running rails, without negatively affecting the secure connection.

In an alternative, likewise production-specific advantageous embodiment, it can be provided that the connection element has a connection body in which a spring plate is inserted, with connection claws and/or insert limiting brackets formed on this spring plate. In this way, the connection claws and/or insertion-limiting brackets can be made from a harder material relative to the running rails, for example, spring steel, while the connection body can be made from a different material that is easier to work.

To be able to connect the spring plate easily and nevertheless rigidly to the connection body, it has fixing brackets that engage in corresponding recesses of the connection body. In an especially advantageous way, some of the connection brackets can be constructed as snap connections that hold the spring plate securely on the connection body, while other fixing brackets are constructed in the form of stops that prevent displacement of the spring plate when the running rails are inserted in the insertion direction.

For a running-rail system named above, if connection elements according to the invention are used, then this advantageously allows an especially quick and simple assembly without additional parts or tools. Advantageously, the running rails are made from a soft material relative to the connection claws, for example, a steel with a tensile strength of up to 400 N/mm$^2$. In contrast, the material of the connection claws is advantageously at least twice as hard as that of the running rails and has, for example, a tensile strength of 1700 N/mm², in particular, for connection elements with a connection body and an inserted spring plate. For an integral connection element, advantageously the same or an only slightly softer material can be used than that for the connection element, in particular, when the connection claws or the means for digging are hardened.

BRIEF DESCRIPTION OF THE DRAWINGS

The invention will be described now using embodiments with reference to the accompanying drawings. Shown are.

DETAILED DESCRIPTION OF THE INVENTION

Figure 1:
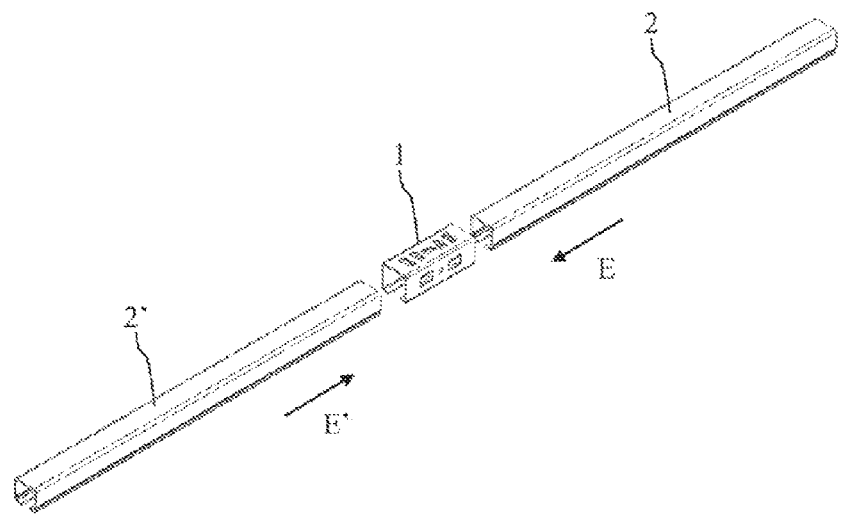
FIG. 1, a running-rail system made from two running rails and a connection element, shown in a disassembled state, FIG. 2, the running-rail system from FIG. 1 in the assembled state, FIG. 3, a three-dimensional view of a connection element according to the invention according to a first embodiment of the invention, FIG. 4, a central longitudinal section through the connection element from FIG. 3, FIG. 5, a three-dimensional view of a spring plate of the connection element from FIG. 3, FIG. 6, a central longitudinal section through the spring plate from FIG. 5, FIG. 7, a detailed view of the spring plate from FIG. 6, FIG. 8, a central longitudinal section through the connection element from FIG. 3 with inserted running rails, FIG. 9, a detailed view of the connection element from FIG. 8, FIG. 10, a detailed view of the connection element from FIG. 9 in cross section, FIG. 11, an alternative three-dimensional view of the connection element from FIG. 8, FIG. 12, a three-dimensional view of a connection element according to another embodiment of the invention, FIG. 13, a detailed view of connection claws of the connection element from FIG. 12, FIG. 14, a detailed view of insertion-limiting brackets of the connection element from FIG. 12, FIG. 15, an alternative embodiment of the connection claws for the connection element from FIG. 12, FIG. 16, the view from FIG. 15 in another perspective.
Figure 2:
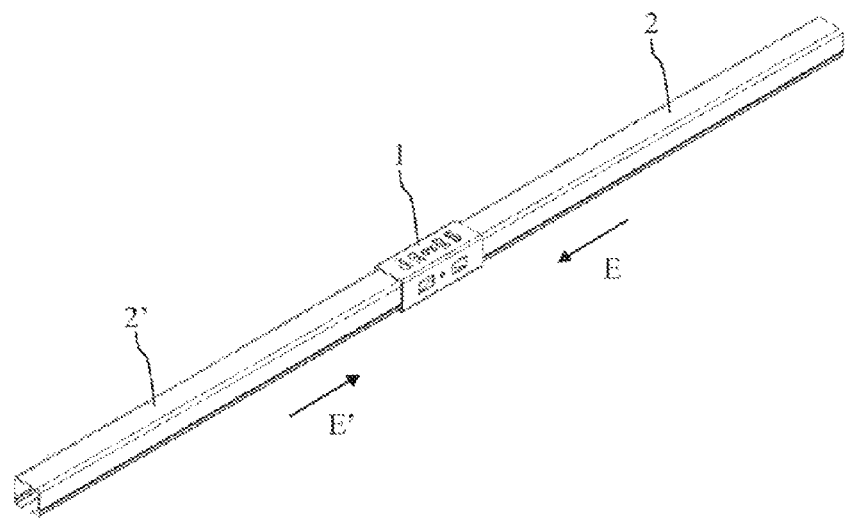

The running-rail system shown as an example in FIG. 1 has a connection element 1, into which two running rails 2, 2' can be pushed from diametrically opposed insertion directions E, E'. FIG. 2 shows the connected state. Because the connection element 1, like also the running rails 2 or 2', have an essentially symmetric embodiment, corresponding parts have the same reference symbols, wherein the parts on the left side in the drawings are each designated, starting from the center of the connection element 1, by an apostrophe.

Both the connection element 1 and also the running rails 2, 2' are made from an essentially elongated steel hollow profile with one side broken in the longitudinal direction. Such running rails 2, 2' are also designated as C-rails. The break is used for holding running wheels of rail vehicles suspended on the running rails 2, 2'. As can be seen especially in FIG. 2, in the assembled state of the running-rail system, the connection element 1 engages around the running rails 2 and 2' inserted into a cavity H, H' of the connection element.

Figure 4:
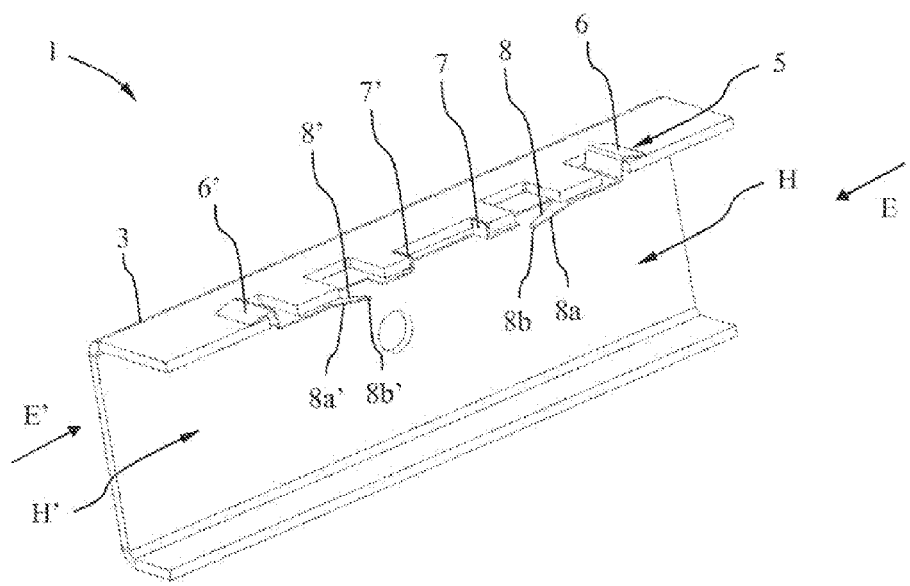
Figure 8:
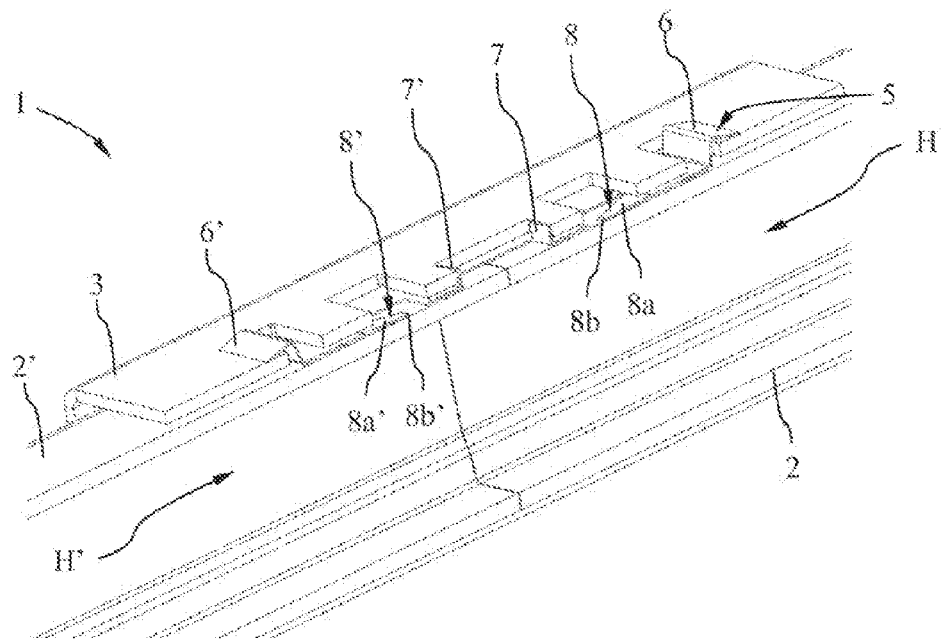

As can be seen especially well in FIGS. 4 and 8, the cavity H, H' of the connection element 1 can be divided into a cavity region H for the first running rail 2 and a cavity region H' for the second running rail 2'. In the present embodiment, the boundary between the cavity region H, H' runs in the center with respect to the longitudinal orientation of the connection element 1. In alternative embodiments, however, the cavity regions H, H' can also have different sizes.

Figure 3:
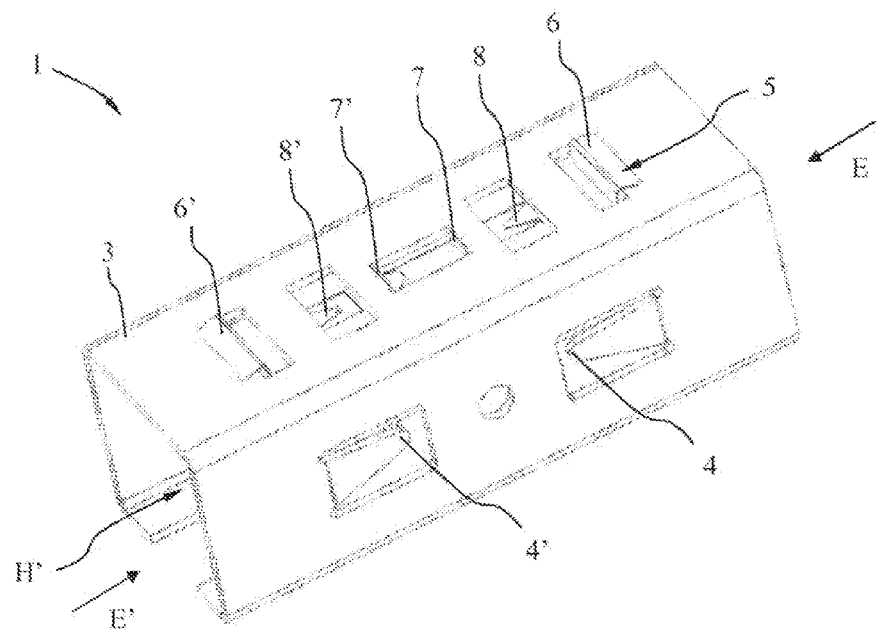

The connection element 1 shown in detail in FIGS. 3 and 4 has a connection body 3 that has guide brackets 4, 4' on its vertical side walls in FIG. 3. In the inserted state of the running rails 2, 2', these guide brackets press from both sides against the running rails 2, 2' and thus center these with respect to the vertical side walls of the connection element 1. On its side opposite the broken side, the connection body 3 has several recesses whose function will be described later.

Figure 5:
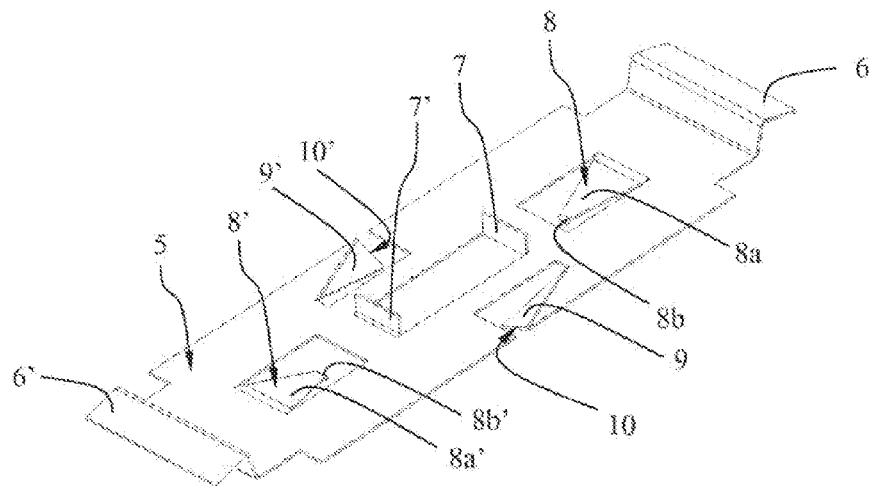
Figure 6:
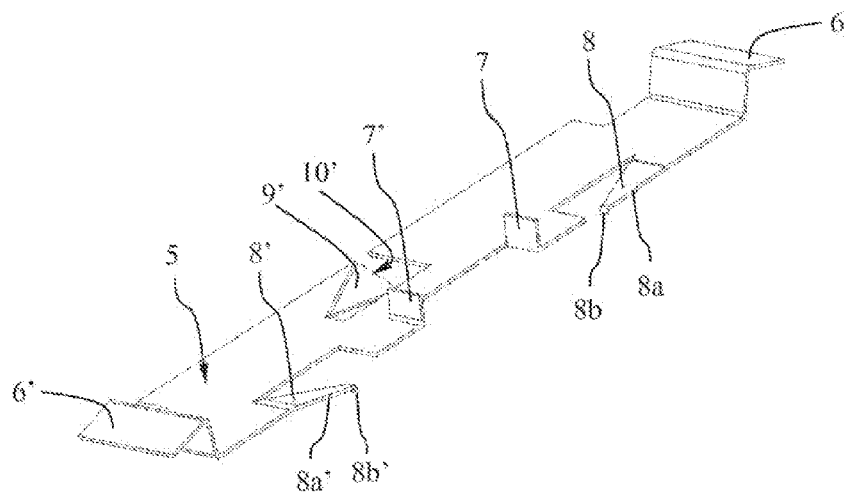
Figure 7:
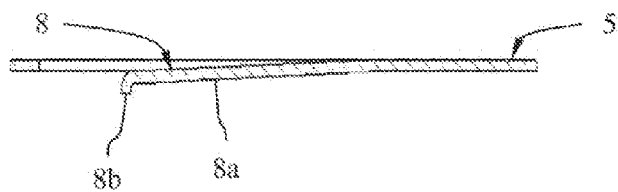

A spring plate 5 is mounted on the inside of the side of the connection body 3 at the top in FIG. 3. The spring plate 5 that can be seen especially well in FIGS. 5-7 is made from spring steel with a tensile strength of 1700 N/mm², thus it is significantly harder than the running rails made from steel with a tensile strength of 400 N/mm². On its longitudinal ends, the spring plate 5 has fixing brackets 6, 6' which, by means of the spring-elasticity of spring plate 5, can be snapped into the outer recesses on the top side of the connection body 3 and thus hold the spring plate 5 in the connection body 3. To prevent displacement of the spring plate 5 in the longitudinal direction of the connection body 3, additional fixing brackets 7, 7' engage in the center recess on the top side of the connection body 3 and contact there directly on their end edges. The fixing brackets 6, 6' and 7, 7' are thus used for the secure holding of the spring plate 5 in the connection body 3 and prevent movement both in the longitudinal direction of the connection body 3 and also perpendicular to this direction.

In order to guarantee that the running rails 2, 2' inserted completely into the cavity H, H' can no longer be pulled out or can fall out easily from the connection element 1, a securing device is formed by connection claws 8, 8' arranged on the spring plate. In the inserted state of the spring plate 5, the connection claws 8, 8' project into the base body 3 in the corresponding insertion direction E, E' at an angle downward into the cavities H and H', respectively. The connection claws 8, 8' are made from a spring-elastic tab 8a' that has, on its front end projecting into the cavity H or H', a front edge 8b, 8b'. In the relaxed state shown in FIG. 7, the front edges 8b, 8b' are directed essentially vertical to the longitudinal axis of the connection body 3.

Due to the resilient properties of the connection claws 8, 8', the running rails 2, 2' can be inserted without large resistance into the corresponding cavity region H or H'. During the insertion, the connection claws 8, 8' are pressed out from the cavity H or H' upward toward the connection body 3. In contrast, if it is attempted to pull the running rails 2, 2' back out from the connection element 1, then the front edges 8b, 8b' are pressed by the elastic effect of the tabs 8a, 8a' onto the surfaces of the running rails 2, 2' facing them and dig into the running rails 2 or 2' due to their greater tensile strength or hardness. The stronger the force pulling running rails 2, 2' out, the stronger the effect of the biasing stress of the connection claws 8, 8' and its inclined position relative to the cavity H, H', thus the front edges 8b, 8b' dig more strongly into the material of the running rails 2 or 2'.

Figure 9:
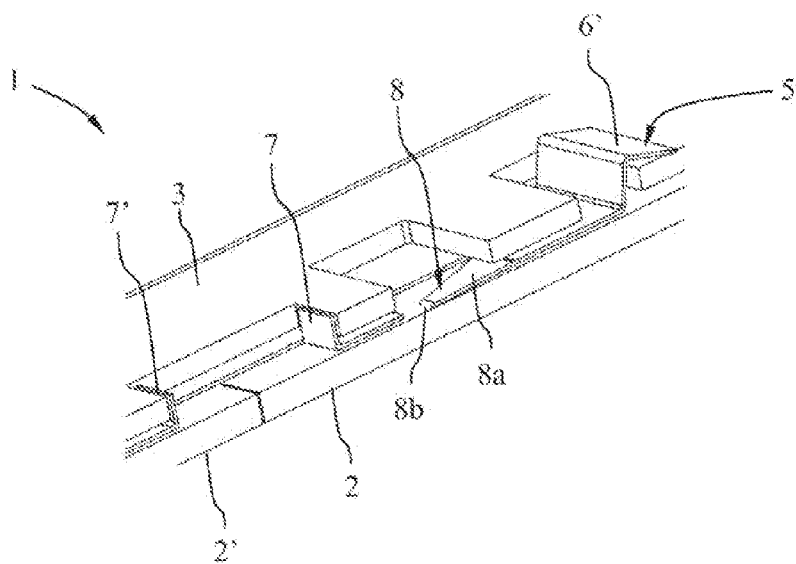
Figure 10:
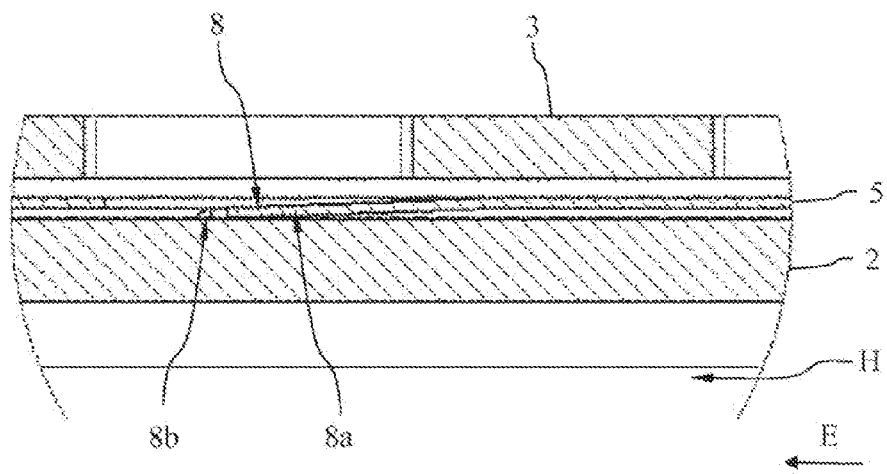

Only above a predetermined high tensile force can the contact force of the connection claws 8, 8' be overcome so the running rails 2, 2' can be pulled out again from the connection element 1 for disassembly. In order to further simplify the pulling-out process, two recesses are arranged in the connection body 3 so that, through these recesses, the front edges 8b, 8b' of the connection claws 8, 8' are visible and can be lifted from the running rails 2, 2'. In addition, in the connection body 3, these recesses allow an inspection as to whether the front edges 8b, 8b' have dug sufficiently into the material of the running rails 2, 2'. This state is easy to see also, in particular, in FIGS. 8-10 that show the connection element 1 with inserted running rails 2, 2'.

In order to guarantee that, when the running rails 2, 2' are inserted, these can be inserted only up to the center of the connection element 1 and thus come to lie only in the corresponding region H or H' of the cavity, insertion-limiting brackets 9, 9' are provided on the spring plate 5. The insertion-limiting brackets 9, 9' are formed by parts of the spring plate 5 projecting into the cavity region H or H', wherein each stop edge 10 or 10' of the insertion-limiting brackets 9, 9' is used as a stop for the running rails 2, 2'. The stop edges 10, 10' here run in a plane perpendicular to the insertion direction E or E', that is, in the present embodiment, through the center plane of the connection body 3 running between the cavity regions H and H'. The insertion-limiting bracket 9 and its stop edge 10 are used as a stop for the running rail 2' inserted from the left into the region H' of the cavity, while the insertion-limiting bracket 9' and its stop edge 10' are used as a stop for the running rail 2 inserted into the region H of the cavity from the right in FIG. 11.

Figure 11:
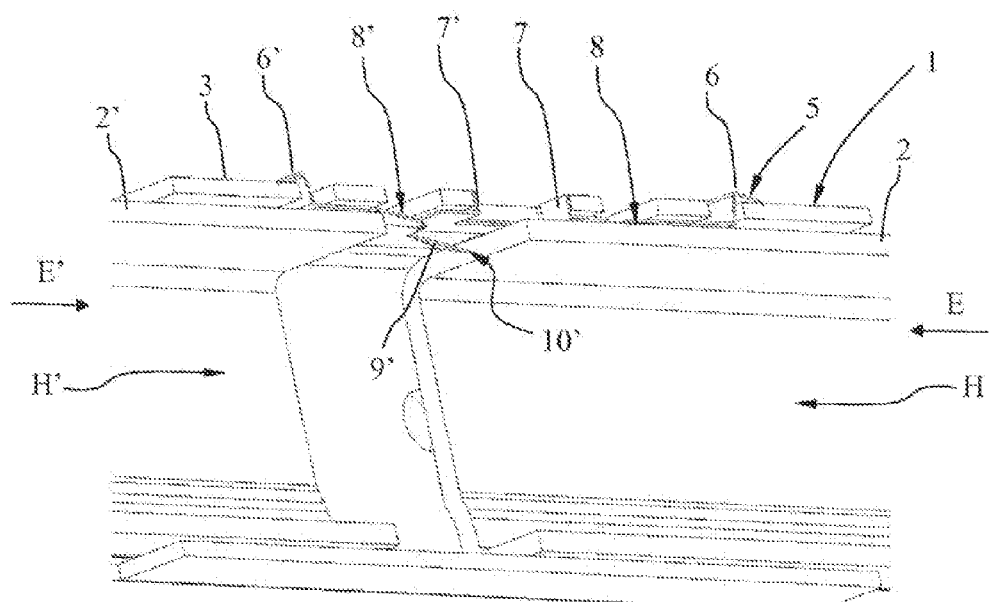

As can be seen especially well with reference to FIG. 11, first the running rail 2 is pushed from the right in FIG. 11 into the cavity region H until it contacts the stop edge 10' of the insertion-limiting bracket 9'. Because the connection claw 8 then engages in the surface of the running rail 2, there is no risk that the running rail 2 will be unintentionally pulled out again from the connection element 1. Through the insertion-limiting bracket 9', it is also guaranteed that the running rail 2 is inserted only up to the middle, that is, exclusively in the cavity region H of the connection element 1. Then the running rail 2' is inserted from the left of FIG. 11 into the cavity region H', wherein, in this way, at the end of the insertion process, the insertion-limiting bracket 9' is pressed upward out from the cavity region H' toward the connection body 3, which is easily possible due to the spring-elastic properties of the spring plate 5. Thus, the already inserted running rail 2 secured by the spring claw 8 is used as the stop for the running rail 2'. The insertion-limiting bracket 9, not visible in FIG. 11, is already pressed upward from the right in FIG. 11 from the cavity H when the first running rail 2 is inserted and is inactive in this insertion sequence of the running rails 2, 2'. In order to allow simple assembly, however, insertion-limiting brackets 9 and 9' are provided for both insertion directions E, E', wherein each bracket remains inactive from these directions according to the insertion sequence of the running rails 2, 2'.

As explained above, the connection element according to the invention allows an especially simple assembly of a running-rail system and also produces a secure connection.

Through the spring plate 5, with slight material consumption, the necessary spring-elastic properties can be easily provided for simultaneously high hardness and tensile strength for the connection claws, while the connection body 3 can be produced in this embodiment from a softer material that is easier to work with respect to production.

Figure 12:
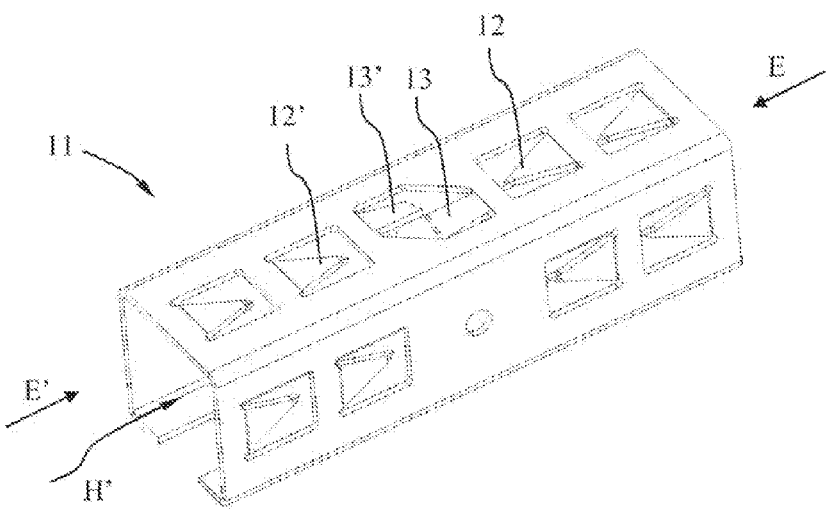
Figure 13:
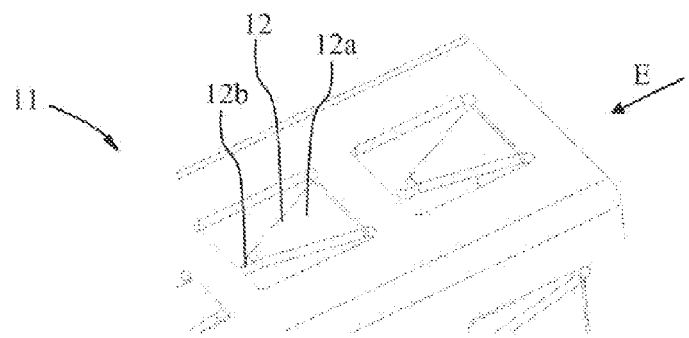

FIGS. 12-13 show another connection element 11 according to the invention. This differs essentially from the connection element 1 shown in FIGS. 1-11 in that it has an integral embodiment and has spring claws and insertion-limiting brackets constructed in another way. The basic functioning of the connection element, the spring claws, and the insertion-limiting brackets, however, corresponds to that described above, so that the discussion below is primarily on the differences.

In contrast to the connection element 1, the connection element 11 is formed in one piece from one material. In order to guarantee a good connection, a plurality of connection claws are formed directly from the connection element 11 on the lateral and top sides of the connection element 11 in FIG. 12, wherein, for the sake of clarity, only the connection claw 12 is described. The statements here, however, apply equally to the other connection claws of the connection element 11. Through the integral material, advantageously the production can be further simplified, because no additional spring plate 5 is required.

As can be seen with reference to the connection claw 12 shown in detail in FIG. 13, this claw projects inward into the cavity H of the connection element 1. An inward projecting spring-elastic tab 12a of the connection element 11 ensures that, in the case of an inserted running rail 2, a point 12b of the connection claw 12, slightly angled toward the running rail, comes in contact with the running rail 2. When the running rail 2 is pulled out, the tab 12a presses the point 12b against the running rail 2, so that the point 12b digs into the running rail 2. Under a large expenditure of force, the running rail 2 can indeed be pulled out, but chips are cut out from the material of the running rail 2 by this force. Due to the shape of the point 12b, in the present embodiment, the connection element 11 can be made from the same material as the running rail 2, so that materials with different hardness values are not needed. However, there is then the disadvantage that the point 12b of the connection claw 12 becomes worn after the running rail 2 has been pulled out several times. Therefore, this disadvantage can be overcome in that the point 12b is hardened, which is realized preferably by inductive hardening. The decisive feature is that the point 12b is harder than the material of the running rail 2.

Figure 14:
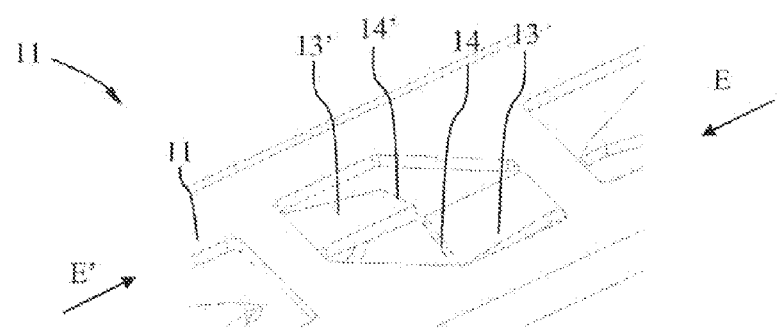

Insertion-limiting brackets 13, 13' similarly shaped from the connection element 11 are shown in detail in FIG. 14. In principle, these function like the insertion-limiting brackets 9, 9' of the first embodiment described above. The insertion-limiting brackets 13, 13' also have stop edges 14, 14' that are constructed as stops for the corresponding other running rail 2' or 2, and that project at an angle into the cavity H, H' and that here run in a plane perpendicular to the insertion direction E or E'. The stop edge 14 here again limits the insertion of the running rail 2' into the cavity region H', while the stop edge 14' limits the insertion of the running rail 2 into the cavity region H. Because the insertion-limiting brackets 13, 13' project elastically into the corresponding cavity region H, H', when the running rail 2, 2' is inserted, they can be pressed out from this region, so that the running rails 2, 2' can be pushed end to end. Here, the first inserted running rail 2 that was first stopped at the stop edge 14' of the insertion-limiting bracket 13' is then used itself as the stop for the subsequently inserted second running rail 2', as already described in detail above for the connection element 1.

Figure 15:
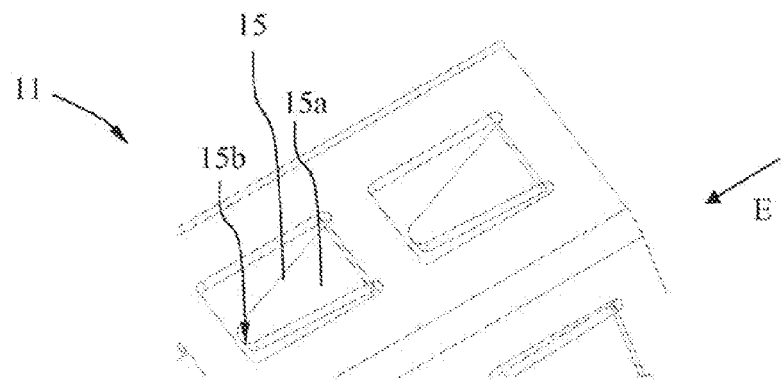
Figure 16:
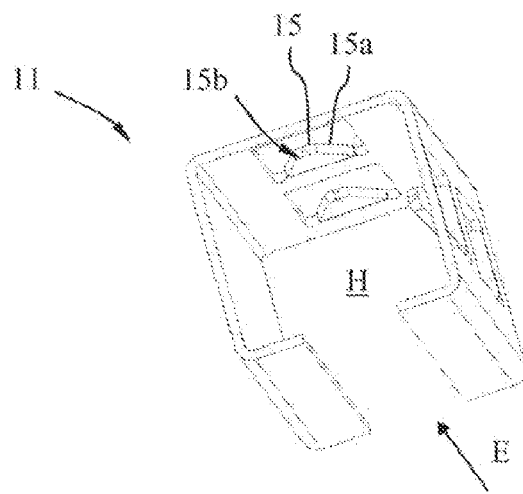

In FIGS. 15 and 16, the connection element 11 has alternatively constructed connection claws that are described as an example with reference to a connection claw 15. Like the connection claw 12, the connection claw 15 is formed from the connection element 11, but does not have an angled point 13b. Instead, the means for digging is here formed by a cutting edge 15a that sits on the front end of a spring-elastic tab 15a projecting into the cavity H. In the present embodiment, because the connection claw 15 was stamped from the blank form of the connection element 11, the edges of the connection claw 15 caused by the stamping have an otherwise undesired stamping burr. In contrast to typical practice, this burr is not removed, but instead provides the sharp cutting edge 15b that advantageously cuts or digs into the running rail when this running rail 2 is pulled out. Such a cutting burr can also be realized by a cutting production of the connection claw 15, for example, by laser cutting. Here, the connection element 11 could also be made from the same material or from a somewhat harder material than the running rail 2. Advantageously, the cutting edge 15b could also be hardened.

In alternative embodiments, instead of the symmetric halves shown here, the connection element could also have connection regions with different sizes for the running rails. Likewise, the connection element could also be formed as a coupling element for different connection systems. For example, one side could be equipped with conventional connection elements, e.g., screws, while the other side has the connection claws according to the invention.

The invention claimed is:

1. A connection element for coupling first and second running rails at longitudinal ends, each running rail having a longitudinally extending central passage for receiving a wheel or a roller, the passages longitudinally open at a break side to permit a vehicle to be associated with the received wheel or roller, the connection element comprising:
   a cavity for receiving the coupled running rails, the cavity longitudinally open at a break side aligned with the break sides of the received running rails in order to permit a vehicle to travel between the received first and second running rails; and
   a securing device for securing the received running rails against being pulled out from the cavity and including at least one spring-elastic, first connection claw projecting into the cavity in a relaxed state, without the first running rail received, at an angle to an insertion direction of the first running rail.

2. The connection element according to claim 1, wherein the at least one first connection claw presses out from the cavity from the relaxed state by the first running rail when the first running rail is inserted and digs into the first running rail elastically as the first running rail is pulled out.

3. The connection element according to claim 1, wherein the at least one first connection claw has a spring-elastic tab projecting into the cavity at an angle in the insertion direction.

4. The connection element according to claim 1, wherein a front end of the connection claw projecting into the cavity is constructed as means for digging (8b; 12b; 15b) into the received first running rail (2).

5. The connection element according to claim 4, wherein the means for digging is a cutting edge or a point.

6. The connection element according to claim 5, wherein the front end is angled in the direction of the running rail to be inserted into the cavity.

7. The connection element according to claim 1, wherein the securing device includes a spring-elastic, second connection claw projecting in the relaxed state at an angle in an insertion direction of the second running rail into the cavity.

8. The connection element according to claim 1, further comprising a spring-elastic, first insertion-limiting bracket arranged on the connection element and projecting into the portion of the cavity provided for receiving the second running rail thereby limiting an insertion depth of the first running rail in its insertion direction into the cavity.

9. The connection element according to claim 8, wherein a stop edge of the first insertion-limiting bracket projects in a plane substantially perpendicular to the insertion direction of the first running rail.

10. The connection element according to claim 8, wherein the at least one first insertion-limiting bracket projects in a relaxed state at an angle into the portion of the cavity provided for receiving the second running rail and is constructed such that it is pressed out of its cavity by the second running rail as the second running rail is inserted.

11. The connection element according to claim 8, further comprising a spring-elastic, second insertion-limiting bracket that is arranged on the connection element and that projects in a relaxed state at an angle into the portion of the cavity provided for receiving the first running rail and that is constructed to be pressed from its cavity by the first running rail as the first running rail is received.

12. The connection element according to claim 8, wherein the connection claws and/or the insertion-limiting brackets are formed integrally from the connection element.

13. The connection element according to claim 11, wherein the connection claws and/or insertion-limiting brackets are formed from a spring plate that is arranged in a connection body of the connection element.

14. The connection element according to claim 13, wherein the spring plate is fixable to the connection body by fixing brackets that engage in corresponding recesses of the connection body.

15. The connection element according to claim 13, wherein the connection claws and/or the insertion-limiting brackets and/or the fixing brackets and/or the spring plate are made from a material that is harder than the running rails.

16. The connection element according to claim 4, wherein the connection claws and/or the means for digging are hardened.

17. A running-rail system comprising a plurality of running rails interrconnectable longitudinal end to longitudinal end by the connection element according to claim 1.

18. The running-rail system according to claim 17, wherein the running rails are made from a material that is soft relative to the connection claws of the connection element.

19. The running-rail system according to claim 17, wherein the tensile strength of the connection claws is at least twice as high as that of the running rails.

20. A connection element for coupling first and second running rails at longitudinal ends, each running rail having a longitudinally extending central passage for receiving a wheel or a roller, the passages longitudinally open at a break side to permit a vehicle to be associated with the received wheel or roller, the connection element comprising:
   a base wall with a first side wall extending from one side of the base wall and a second side wall extending from an opposite side of the base wall, the base wall and first and second side walls defining a cavity for receiving the coupled running rails at opposite ends of the cavity, the cavity longitudinally open at a break side extending from one end of the cavity to an opposite end of the cavity and aligned with the break sides of the received running rails in order to permit a vehicle to travel between the received first and second running rails; and
   a securing device for securing the received running rails against being pulled out from the cavity and including at least one spring-elastic first connection claw projecting into the cavity in a relaxed state, without the first running rail received, at an angle to an insertion direction of the first running rail.

* * * * *

UNITED STATES PATENT AND TRADEMARK OFFICE
CERTIFICATE OF CORRECTION

PATENT NO. : 8,398,000 B2  Page 1 of 1
APPLICATION NO. : 12/808700
DATED : March 19, 2013
INVENTOR(S) : Georg Gramatte It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 311 days.

Signed and Sealed this
First Day of September, 2015

Michelle K. Lee
*Director of the United States Patent and Trademark Office*